US011960991B2

(12) United States Patent
Fathony et al.

(10) Patent No.: US 11,960,991 B2
(45) Date of Patent: Apr. 16, 2024

(54) DEVICE AND METHOD FOR TRAINING A CLASSIFIER

(71) Applicants: Robert Bosch GmbH, Stuttgart (DE); Carnegie Mellon University, Pittsburgh, PA (US)

(72) Inventors: Rizal Fathony, Pittsburgh, PA (US); Frank Schmidt, Leonberg (DE); Jeremy Zieg Kolter, Pittsburgh, PA (US)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 770 days.

(21) Appl. No.: 16/950,396

(22) Filed: Nov. 17, 2020

(65) Prior Publication Data

US 2021/0165391 A1 Jun. 3, 2021

(30) Foreign Application Priority Data

Dec. 2, 2019 (EP) .................................. 19212867

(51) Int. Cl.
| | |
|---|---|
| *G06N 3/0464* | (2023.01) |
| *A63F 13/67* | (2014.01) |
| *G05B 19/4155* | (2006.01) |
| *G06N 3/08* | (2023.01) |
| *G06N 3/084* | (2023.01) |

(Continued)

(52) U.S. Cl.
CPC .............. *G06N 3/08* (2013.01); *A63F 13/67* (2014.09); *G05B 19/4155* (2013.01); *G06N 3/0464* (2023.01); *G06N 3/084* (2013.01); *G07C 3/005* (2013.01); *G07C 9/10* (2020.01);

(Continued)

(58) Field of Classification Search
CPC .......... G06N 3/08; G06N 20/00; G06N 3/045; G06N 5/025; A63F 13/67; G05B 19/4155; G05B 2219/40496; G06Q 10/0639; G06Q 50/04; G07C 3/005; G07C 9/10; G06F 18/21; G06F 18/24; G06F 18/214; G06F 18/2411
See application file for complete search history.

(56) References Cited

U.S. PATENT DOCUMENTS

2015/0332463 A1 * 11/2015 Galera ..................... H04N 7/18
382/103

OTHER PUBLICATIONS

Koyejo et al. "Consistent Multilabel Classification" from "Advances in Neural Information Processing Systems 28 (NIPS 2015)" (Year: 2015).*

(Continued)

*Primary Examiner* — Yuhui R Pan
(74) *Attorney, Agent, or Firm* — NORTON ROSE FULBRIGHT US LLP; Gerard A. Messina

(57) ABSTRACT

A computer-implemented method for training a classifier, particularly a binary classifier, for classifying input signals to optimize performance according to a non-decomposable metric that measures an alignment between classifications corresponding to input signals of a set of training data and corresponding predicted classifications of the input signals obtained from the classifier. The method includes providing weighting factors that characterize how the non-decomposable metric depends on a plurality of terms from a confusion matrix of the classifications and the predicted classifications, and training the classifier depending on the provided weighting factors.

13 Claims, 11 Drawing Sheets

(51) Int. Cl.
*G07C 3/00* (2006.01)
*G07C 9/10* (2020.01)
*G06F 18/21* (2023.01)
*G06F 18/24* (2023.01)

(52) U.S. Cl.
CPC .... *G05B 2219/40496* (2013.01); *G06F 18/21* (2023.01); *G06F 18/24* (2023.01)

(56) References Cited

OTHER PUBLICATIONS

Fathony et al. "Consistent Robust Adversarial Prediction for General Multiclass Classification (Nov. 20, 2019)" (Year: 2019).*
Zhan Shi et al., "Bregman Divergence for Stochastic Variance Reduction: Saddle-Point and Adversarial Prediction," in Advances in Neural Information Processing Systems, 2017, pp. 1-11. Downloaded on Nov. 11, 2020.
Hong Wang et al., "Adversarial Prediction Games for Multivariate Losses," in Advances in Neural Information Processing Systems, 2015, pp. 1-9. Downloaded on Nov. 11, 2020.
Eban, et al.:"Large-scale Learning With Global Non-Decomposable Objectives", arxiv.org, Cornell University Library, (Aug. 17, 2016), pp. 1-9, XP080720362.

* cited by examiner

DEVICE AND METHOD FOR TRAINING A CLASSIFIER

CROSS REFERENCE

The present application claims the benefit under 35 U.S.C. § 119 of European Patent Application No. EP 19212867.6 filed on Dec. 2, 2019, which is expressly incorporated herein by reference in its entirety.

FIELD

The present invention concerns a method for training a classifier, a method for using this classifier a computer program and a machine-readable storage medium, a control system, and a training system.

BACKGROUND INFORMATION

Zhan Shi, Xinhua Zhang, and Yaoliang Yu, "Bregman divergence for stochastic variance reduction: Saddle-point and adversarial prediction" in Advances in Neural Information Processing Systems, pages 6033-6043, 2017 describes a machine-learning method for optimizing the $F_1$-score metric by applying an adversarial prediction technique using marginalization that reduces the optimization over full exponentially sized conditional distributions in their polynomially-sized marginal distributions.

Hong Wang, Wei Xing, Kaiser Asif, and Brian Ziebart. "Adversarial prediction games for multivariate losses." in Advances in Neural Information Processing Systems, pages 2710-2718, 2015 describes the use of a double oracle technique to train a classifier for a few performance metrics.

SUMMARY

Although the accuracy metric is the most popular evaluation measures, many applications require the use of more complex evaluation metrics that are not additively-decomposable into sample-wise measures, i.e. they cannot be expressed as a sum of contributions of individual samples in an evaluation data set.

In real-world applications, the performance of machine learning algorithms is preferably measured with evaluation metrics tailored specifically to the problem of interest. Such evaluation metrics are often non-decomposable metrics.

For example, in optical inspection tasks, which may for example be used in an industrial production environment to automatically check whether or not produced goods are produced according to the specifications, it may be desirable to use Precision, Recall, Specificity or the Fβ-score as examples of such non-decomposable metrics.

Assuming, for example, that a label of "1" means "OK" and "0" means "not OK". Precision, i.e., the ratio between true positive and predicted positive samples, measures the percentage of how many "1"-labels are actually correct. An end-of-line check with a Precision of 100% would result in shipping not a single faulty product. In a machine trained for high Precision, it may also be envisioned to rely on all "1" labels and carry out a (potentially very expensive) re-check only for those produced goods that are labelled as "0".

Recall, i.e., the ratio between true positives and actual positives, measures the percentage of how actual many "OK"-cases are correctly labelled. If Recall is very high, it may be envisioned to forgo the expensive re-checking of goods that are labeled as "0" and discard them right away.

Specificity, i.e., the ratio between true negatives and actual negatives, measures the percentage of how many "not OK"-cases are correctly labeled as "0". If Specificity is high, it may be envisioned to ship all goods that are labeled as "1" right away.

Fβ can be considered a smooth interpolation between Precision (β=0) and the Harmonic means between Precision and Recall (β=1) to satisfy both goals of high Precision and high Recall.

These metrics are also important for other applications. For example, in tasks relying on semantic segmentation of, e.g., a received video image (like, e.g., pedestrian detection in an automated vehicle or detection of suspicious objects in a video surveillance system), $F_1$ is an important optimization goal. That is because for an object that takes over most of an image, Recall is usually larger than Precision, whereas for small objects it is the other way around. By penalizing bad Recall and Precision at the same time, the resulting segmentation is improved.

In the case of an automated personal assistant that uses the classifier to interpret user commands, it may be desirable that the automated personal assistant correctly recognizes as many actual commands as possible, which is why a high Precision may be a desirable evaluation metric.

In the case of an access control system that may grant access depending on the output of the classifier, it may be desirable that no access is granted to unauthorized persons. For such systems, a high Specificity may be desirable.

Furthermore, using the Fβ-metric is useful for classification tasks with imbalanced datasets. In medical fields for example when evaluating images of an imaging system, Recall, Specificity, and Informedness are preferred metrics to ensure good classification performance.

In other words, optimizing according to such non-decomposable metrics in training has great practical value. However, training algorithms for non-decomposable metrics have not been widely used in practical applications, particularly in the modern machine learning applications that rely on the representational power of deep architectures, where training is typically done using gradient-based method. Instead of being trained to optimize the evaluation metric of interest, they may instead be trained to minimize cross entropy loss, with the hope that it will indirectly also optimize the non-decomposable metric.

An example embodiment of the present invention provides a method that may have the advantage of being able to optimize the performance of a classifier with respect to a large range of non-decomposable performance metrics using gradient-based learning procedures, which leads to improved performance on these metrics.

Further improvements and embodiments of the present invention are described herein.

In a first aspect, the present invention is concerned with a computer-implemented method for training a classifier, in particular a binary classifier, for classifying input signals to optimize performance according to a non-decomposable metric that measures an alignment between classifications corresponding to input signals of a set of training data and corresponding predicted classifications of the input signals obtained from the classifier (in other words, the metric measures how well classifications and corresponding predicted classifications match). In accordance with an example embodiment of the present invention, the method includes the steps of:

providing weighting factors that characterize how the
non-decomposable metric depends on a plurality of terms from a confusion matrix of the classifications and the predicted classifications;

training the classifier depending on the provided weighting factors.

The invention has the advantage that the optimization of the classifier can be carried out automatically for a large range of non-decomposable metrics depending on the provided weighting factors.

The non-decomposable metric may be given by the formula $$\sum_j \frac{a_j \cdot TP + b_j \cdot TN + f_j(PP, AP, PN, AN)}{g_j(PP, AP, PN, AN)}, \quad (M)$$

with weighting factors $a_j$, $b_j$, $f_j$, $g_j$, where $a_j$ and $b_j$ are scalar values and $f_j$ and $g_j$ are parametrized (including parameter-free) functions, and TP, TN, PP, PN, AP and AN are entries of the confusion matrix, which may be presented as

| | Actual | | |
|---|---|---|---|
| Pred. | Positive | Negative | |
| Positive | True Pos. (TP) | False Pos. (FP) | Predicted Pos. (PP) |
| Negative | False Neg. (FN) | True Neg. (TN) | Predicted Neg. (PN) |
| | Actual Pos. (AP) | Actual Neg. (AN) | All Data (ALL) |

It has been found out that a non-decomposable metric that can be written in this form allows for efficient training of the classifier depending on the provided weighting factors.

Note that the dependency on entries PN and AN is redundant and will be ignored in the following.

Examples of such metrics are shown in this table:

| NAME | FORMULA |
|---|---|
| Precision | $\dfrac{TP}{PP}$ |
| Recall/Sensitivity/TPR | $\dfrac{TP}{AP}$ |
| Specificity/TNR | $\dfrac{TN}{AN}$ |
| $F_\beta$-score | $\dfrac{(1+\beta^2)TP}{\beta^2 \; AP + PP}$ |
| Geom. mean of Prec. & Recall | $\dfrac{TP}{\sqrt{PP \cdot AP}}$ |
| Balanced Accuracy | $\dfrac{1}{2}\left(\dfrac{TP}{AP} + \dfrac{TN}{AN}\right)$ |
| Bookmaker Informedness | $\dfrac{TP}{AP} + \dfrac{TN}{AN} - 1$ |
| Markedness | $\dfrac{TP}{PP} + \dfrac{TN}{PN} - 1$ |
| Cohen's kappa score | $\dfrac{(TP+TN)/ALL - (AP \cdot PP + AN \cdot PN)/ALL^2}{1 - (AP \cdot PP + AN \cdot PN)/ALL^2}$ |
| Matthews correlation coefficient | $\dfrac{TP/ALL - (AP \cdot PP)/ALL^2}{\sqrt{AP \cdot PP \cdot AN \cdot PN / ALL^2}}$ |

Preferably, the optimization is carried out as an adversarial prediction method, i.e., by finding an equilibrium, more specifically a Nash equilibrium, of a two-player game between a first player (a predictor) and a second (adversary) player, wherein the first player tries to find first classifications corresponding to (all) input values of the data and the second player tries to find second classifications corresponding to (all) input values of the data, and wherein the first player tries to maximize and the second player tries to minimize an expectation value of the metric in which the confusion matrix is evaluated based on the first and the second classifications, wherein the second classifications are subject to a moment-matching constraint.

In mathematical terms, the adversarial prediction can be formulated as $$\max_{\mathcal{P}(\hat{Y})} \min_{\mathcal{Q}(\check{Y})} \mathbb{E}_{\tilde{P}(X);\mathcal{P}(\hat{Y});\mathcal{Q}(\check{Y})}[\text{metric}(\hat{Y}, \check{Y})] \quad (1)$$

$$s.t. : \mathbb{E}_{\tilde{P}(X);\mathcal{Q}(\check{Y})}[\phi(X, \check{Y})] = \mathbb{E}_{\tilde{P}(X,Y)}[\phi(X, Y)]$$

where $$\mathcal{P}(\hat{Y}) \triangleq \hat{P}(\hat{Y} \mid X)$$

is the first player's probabilistic prediction and $$\mathcal{Q}(\check{Y}) \triangleq \check{P}(\check{Y} \mid X)$$

is the adversary's distribution, and $\tilde{P}$ is the empirical distribution.

The adversarial player needs to approximate the training data by selecting a conditional probability $\mathcal{Q}(\check{Y})$ whose feature expectations match the empirical feature statistics. On the other hand, the predictor is freely to choose any conditional probability $\mathcal{P}(\hat{Y})$ that maximizes the expected metric.

Here, $\phi$ denotes a feature vector of the classifier. For example, if the classifier is given by a neural network, $\phi$ is the input to the final fully-connected layer that acts as a linear classifier to the features. The feature function is additive, i.e., $\phi(x, y) = \Sigma_i \phi(x_i, y_i)$. For simplicity, it is possible to assume $\phi(x_i, y_i=0)=0$ in the following (if not, the feature extractor $\phi$ can be replaced with $\phi'$ by $\phi'(x, 0)=0$ and $\phi'(x, 1)=\phi(x, 1)-\phi(x, 0)$.

The boundary condition of the min-max optimization is what is called the "moment-matching constraint", in other words the "moment-matching constraint" implies that the empirical expectation value over the test data of the feature vector $\phi$ matches the expectation value of the feature vector $\phi$ over the empirical distribution ($\tilde{P}(X)$)) of input signals (x) and the conditional probability of the adversary's prediction $Q(\check{Y})$ of the output signals (y).

It should be noted that although this discussion focusses on binary classifiers, it can easily be used to train a general classifier. To this end, it may be envisioned to build the general classifier using a plurality of binary classifiers. For example, it may be envisioned to build a single binary classifier for each class into which the general classifier classifies its input data, wherein each of the binary classifiers has to decide whether the input data pertains to the associated class, or not. Alternatively, it may be envisioned to arrange the total number of target classes in a tree-like taxonomy with binary bifurcations, wherein a plurality of binary classifiers Carrying out the optimization with this adversarial prediction method is a way to robustly maximize the performance metric against adversaries. In other words, the resulting classifier is more robust. This present invention shows a way of applying this adversarial prediction framework to classification problems to optimize non-decomposable metrics in training.

For example, the optimization may be carried out by finding an optimum value of a Lagrangian multiplier corresponding to the moment-matching constraint and wherein trained parameters of a fully-connected layer of the binary classifier are set equal to the optimum value of the Lagrangian multiplier. (Note that the Lagrangian multiplier is vector-valued). This exploits the strong duality of convex-concave saddle point problems, and may be written as $$\max_{\theta} \mathbb{E}_{P(X,Y)} \left[ \ldots \left[ \text{metric}(\hat{Y}, \check{Y}) - \theta^T (\phi(X, \check{Y}) - \phi(X, Y)) \right] \right], \quad (2)$$

It turns out that the parameters of the fully-connected layer can be conveniently optimized by setting them equal to the optimum values of the Lagrangian multipliers under the moment-matching constraint.

In order to solve it efficiently, preferably, the expectation value is computed based on marginal probabilities of the first classifications and/or the second classifications, wherein the marginal probabilities represent marginal probabilities of a classification of a given input value being equal to a predefined classification and the sum of all classifications being equal to a predefined sum value.

In other words the marginal probabilities $P_k^a$ of the first classifications can be written as a vector with n items (n being the number of samples in the training data set) and represented by elements $(p_k^a)_i$ which are equal to $\mathcal{P}(\hat{y}_i = a, \Sigma_i \hat{y}_i = k)$) (i.e., the marginal probability of the event where $y_i = 1$ and $\Sigma_i y_i = k$). Similarly, we also denote $q_l^a$ for the adversary's corresponding marginal probabilities. The marginal probabilities of the second (adversary) player's classifications are represented in an analogous fashion by $(q_l^a)_i$ as $\mathcal{Q}(\check{y}_i = a, \Sigma_i \check{y}_i = l)$.

The marginal probability of sums will be denoted as $r_k = \mathcal{P}(\Sigma_i \hat{y}_i = k)$ and $s_l = \mathcal{Q}(\Sigma_i \check{y}_i = l)$.

To understand how this contributes to the solution of equation (2), consider the inner minimax problem of equation (2), i.e.:

$$\min_{\mathcal{Q}(\check{Y},p_Y)} \max_{\mathcal{P}(\hat{Y})} \mathbb{E}_{P(Y,\hat{Y}\cdot\check{Y})} \left[ \text{metric}(\hat{Y}, \check{Y}) - \theta^T \phi(X, \check{Y}) \right]$$

Using the above notations, the expected value of the above metric over exponentially sized conditional probabilities $\mathcal{P}(\hat{Y})$ and $\mathcal{Q}(\check{Y})$ can be expressed as the sum of functions over marginal probably variables as follows:

$$\mathbb{E}_{\mathcal{P}(\hat{Y})} \left[ \text{metric}(\hat{Y}, \check{Y}) \right] = \quad (3)$$
$$\sum_{k \in [0,n]} \sum_{l \in [0,n]} \sum_j \frac{1}{g_j(k, l)} \{ a_j [p_k^1 \cdot q_l^1] + b_j [p_k^0 \cdot q_l^0] + f_j(k, l) r_k s_l \}.$$

Some metrics (e.g., precision, recall, F-score, sensitivity, and specificity) enforce special cases to avoid division by zero. For the metrics that contain true positive, the special cases are usually defined as:

metric(0,0)=1;metric(0,y)=0,∀y≠0; metric($\hat{y}$,0)=0,
   ∀$\hat{y}$≠0,   (S1)

whereas for the ones with true negative, their cases are:

metric(1,1)=1;metric(1,y)=0,∀y≠1; metric($\hat{y}$,1)=0,
   ∀$\hat{y}$≠1.   (S2)

Here, $\hat{y}=0$ and $\hat{y}=1$ means the classifier predicts all samples as negative and positive, respectively. If the metric is such that the special cases are enforced, equation (3) has to be modified accordingly. For example, if both special cases for true positive and true negative are enforced, it becomes:

$$\sum_{k \in [1,n-1]} \sum_{l \in [1,n-1]} \sum_j \frac{1}{g_j(k, l)} \{ a_j [p_k^1 \cdot q_l^1] + b_j [p_k^0 \cdot q_l^0] + f_j(k, l) r_k s_l \} + \quad (4)$$
$$\mathcal{P}(0) \mathcal{Q}(0) + \mathcal{P}(1) \mathcal{Q}(1).$$

Let us denote n×n marginal distribution matrix P where each column $P_{(:,k)}$ represents $p_k^1$. Similarly, denote a matrix Q for $q_k^1$. Let us denote $\Psi$ as a n×n matrix where each of its columns denotes the feature for each sample, i.e., $\Psi_{:,i} = \phi(x_i, y_i = 1)$ and m is the number of the feature. Equation (2) can now be rewritten as $$\max_{\theta} \left\{ \min_{Q \in \Delta} \max_{P \in \Delta} \left[ \sum_{k,l \in [0,n]} \sum_j \frac{1}{g_j(k, l)} \{ a_j [p_k^1 \cdot q_l^1] + b_j [p_k^0 \cdot q_l^0] + f_j(k, l) r_k s_l \} - \langle Q^T 1, \Psi^T \theta \rangle \right] + \langle y, \Psi^T \theta \rangle \right\}, \quad (5)$$

where $\Delta$ is the set of valid marginal probability matrices denoted as:

$$\Delta = \left\{ P \left| \begin{array}{ll} p_{i,k} \geq 0 & \forall i, k \in [1, n] \\ p_{i,k} \leq \frac{1}{k} \sum_j p_{j,k} & \forall i, k \in [1, n] \\ \sum_k \frac{1}{k} \sum_i p_{i,k} \leq 1 & \end{array} \right. \right\}.$$

As a very efficient way to solve the optimization, it can be envisaged to solve the two-player game by solving a linear program in only one of those two players. This is possible because the inner minimization over Q in equation (5) can be solved as a linear program in the form of:

$$\min_{Q \in \Delta; \alpha \geq 0; v \geq 0} v + c(Q) - \langle Q, \Psi^T \theta 1^T \rangle \quad (6)$$

$$\text{s.t.} : v \geq Z(Q)_{(i,k)} - \alpha_{i,k} + \frac{1}{k} \sum_j \alpha_{j,k}, \forall i, k \in [1, n],$$

where c(Q) is a linear function of Q and Z(Q) is a matrix-valued linear function of Q, both of which are defined analytically by the form of the metric.

In some machine learning settings, it may be desirable to optimize a performance metric subject to constraints on other metrics. This occurs in the case where there are trade-offs between different performance metric.

For example, a machine learning system may want to optimize the Precision of the prediction, subject to its Recall being greater than a predefinable threshold. For these tasks, the adversarial prediction formulation can be written as $$\max_{\mathcal{P}(\check{Y})\mathcal{Q}(\check{Y})} \min \mathbb{E}_{P(X);P(\check{Y});\mathcal{Q}(\check{Y})}[\text{metric}^{(0)}(\hat{Y}, \check{Y})] \qquad (7)$$

$$\text{s.t.}: \mathbb{E}_{\tilde{P}(X);\mathcal{Q}(\check{Y})}[\phi(X, \check{Y})] = \mathbb{E}_{\tilde{P}(X,Y)}[\phi(X, Y)],$$

$$\mathbb{E}_{\tilde{P}(X,Y);P(\hat{Y})}[\text{metric}^{(i)}(\hat{Y}, Y)] \geq \tau_i \forall i \in [1, t],$$

where t is the number of the metric constraints, and T is a predefinable threshold. Just as outlined above, this can be computed as $$\max_{\theta} \left\{ \min_{Q \in \Delta} \right.$$
$$\max_{P \in \Delta \cap \Gamma} \left[ \sum_{k,l \in [0,n]} \sum_j \frac{1}{g_j^{(0)}(k, l)} \{a_j^{(0)}[p_k^1 \cdot q_l^1] + b_j^{(0)}[p_k^0 \cdot q_l^0] + f_j^{(0)}(k, l) r_k s_l \} - $$
$$\left. \langle Q^T 1, \Psi^T \theta \rangle \right] + \langle y, \Psi^T \theta \rangle \right\}, \qquad (8)$$

where $\Gamma$ is the set of marginal probability matrices defined as:

$$\Gamma = \qquad (9)$$
$$\left\{ P \left| \sum_{k \in [0,n]} \sum_j \frac{1}{g_j^{(i)}(k, l)} \{a_j^{(i)}[p_k^1 \cdot y] + b_j^{(0)}[p_k^0 \cdot (1-y)] + f_j^{(0)}(k, l) r_k \} \geq \tau_i, \right. \right.$$
$$\left. \forall i \in [1, t] \right\},$$

where $l = \sum_{i'} y_{i'}$.

Therefore, according to a further aspect of the present invention, the optimization of the performance according to the non-decomposable metric is further subject to an inequality constraint of an expected value of a second metric that measures an alignment between the classifications and the predicted classifications.

This, too, can be solved as a linear program in the form of:

$$\min_{Q \in \Delta; \alpha \geq 0; \beta \geq 0; v \geq 0} v + c(Q) - \langle Q, \Psi^T \theta 1^T \rangle + \sum_l (\mu_l - \tau_l) \qquad (10)$$

$$\text{s.t.}: v \geq Z(Q)_{(i,k)} - \alpha_{i,k} + \frac{1}{k} \sum_j \alpha_{j,k} + \sum_l \beta_l (B^{(l)})_{(i,k)}$$

$$\forall i, k \in [1, n].$$

Here, $\mu_l$ is a constant and $B^{(l)}$ is a matrix, both of which are defined analytically by the l-th metric constraint and the ground truth label.

Example embodiments of the present invention are described with reference to the figures in more detail.

DETAILED DESCRIPTION OF EXAMPLE EMBODIMENTS

Figure 1:
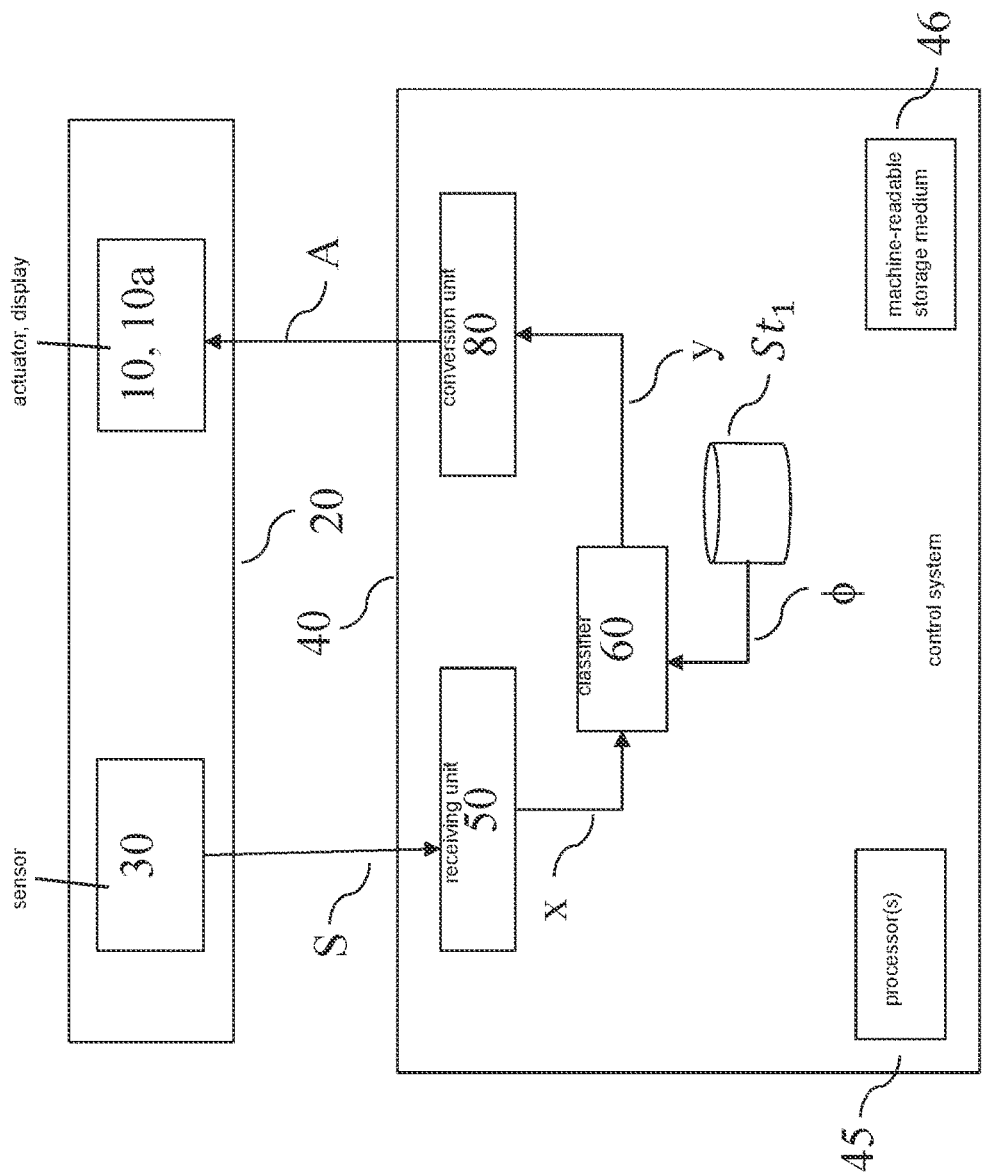
FIG. 1 shows a control system having a classifier controlling an actuator in its environment, in accordance with an example embodiment of the present invention.

Shown in FIG. 1 is one example embodiment of an actuator 10 in its environment 20. Actuator 10 interacts with a control system 40. An actuator 10 may be a technical system that is capable of receiving actuator control commands A and of acting in accordance with the received actuator control commands, A. Actuator 10 and its environment 20 will be jointly called actuator system. At preferably evenly spaced distances, a sensor 30 senses a condition of the actuator system. The sensor 30 may comprise several sensors. Preferably, sensor 30 is an optical sensor that takes images of the environment 20. An output signal S of sensor 30 (or, in case the sensor 30 comprises a plurality of sensors, an output signal S for each of the sensors) which encodes the sensed condition is transmitted to the control system 40.

Thereby, control system 40 receives a stream of sensor signals S. It then computes a series of actuator control commands A depending on the stream of sensor signals S, which are then transmitted to actuator 10.

Control system 40 receives the stream of sensor signals S of sensor 30 in an optional receiving unit 50. Receiving unit 50 transforms the sensor signals S into input signals x. Alternatively, in case of no receiving unit 50, each sensor signal S may directly be taken as an input signal x. Input signal x may, for example, be given as an excerpt from sensor signal S. Alternatively, sensor signal S may be processed to yield input signal x. Input signal x may comprise image data corresponding to an image recorded by sensor 30, or it may comprise audio data, for example if sensor 30 is an audio sensor. In other words, input signal x may be provided in accordance with sensor signal S.

Input signal x is then passed on to a classifier 60, for example an image classifier, which may, for example, be given by an artificial neural network.

Classifier 60 is parametrized by parameters ξ, which are stored in and provided by parameter storage $St_1$.

Classifier 60 determines output signals y from input signals x. The output signal y comprises information that assigns one or more labels to the input signal x. Output signals y are transmitted to an optional conversion unit 80, which converts the output signals y into the control commands A. Actuator control commands A are then transmitted to actuator 10 for controlling actuator 10 accordingly. Alternatively, output signals y may directly be taken as control commands A.

Actuator 10 receives actuator control commands A, is controlled accordingly and carries out an action corresponding to actuator control commands A. Actuator 10 may comprise a control logic, which transforms actuator control command A into a further control command, which is then used to control actuator 10.

In further embodiments, control system 40 may comprise sensor 30. In even further embodiments, control system 40 alternatively or additionally may comprise actuator 10.

In still further embodiments, it may be envisioned that control system 40 controls a display 10a instead of an actuator 10. Furthermore, control system 40 may comprise a processor 45 (or a plurality of processors) and at least one machine-readable storage medium 46 on which instructions are stored which, if carried out, cause control system 40 to carry out a method according to one aspect of the present invention.

Figure 2:
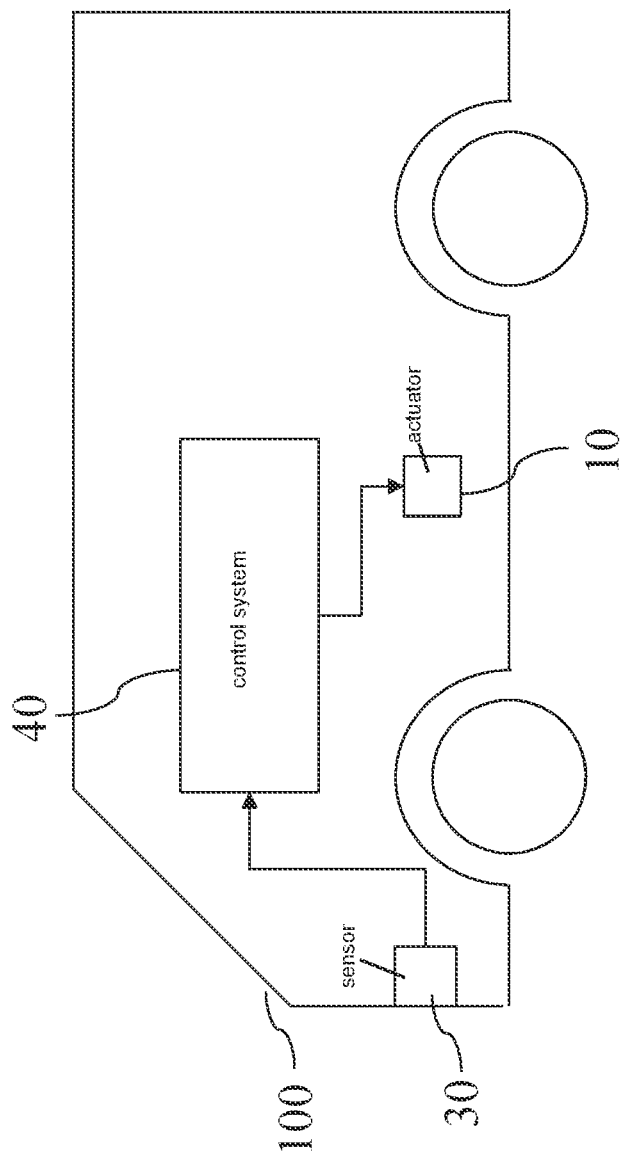
FIG. 2 shows the control system controlling an at least partially autonomous robot, in accordance with an example embodiment of the present invention.

FIG. 2 shows an embodiment in which control system 40 is used to control an at least partially autonomous robot, e.g., an at least partially autonomous vehicle 100.

Sensor 30 may comprise one or more video sensors and/or one or more radar sensors and/or one or more ultrasonic sensors and/or one or more LiDAR sensors and or one or more position sensors (like, e.g., GPS). Some or all of these sensors are preferably but not necessarily integrated in vehicle 100.

Alternatively or additionally sensor 30 may comprise an information system for determining a state of the actuator system. One example for such an information system is a weather information system that determines a present or future state of the weather in environment 20.

For example, using input signal x, the classifier 60 may for example detect objects in the vicinity of the at least partially autonomous robot. Output signal y may comprise an information that characterizes where objects are located in the vicinity of the at least partially autonomous robot. Control command A may then be determined in accordance with this information, for example to avoid collisions with the detected objects.

Actuator 10, which is preferably integrated in vehicle 100, may be given by a brake, a propulsion system, an engine, a drivetrain, or a steering of vehicle 100. Actuator control commands A may be determined such that actuator (or actuators) 10 is/are controlled such that vehicle 100 avoids collisions with the detected objects. Detected objects may also be classified according to what the classifier 60 deems them most likely to be, e.g., pedestrians or trees, and actuator control commands A may be determined depending on the classification.

In one embodiment, classifier 60 may be designed to identify lanes on a road ahead, e.g., by classifying a road surface and markings on the road, and identifying lanes as patches of road surface between the markings. Based on an output of a navigation system, a suitable target lane for pursuing a chosen path can then be selected, and depending on a present lane and the target lane, it may then be decided whether vehicle 10 is to switch lanes or stay in the present lane. Control command A may then be computed by, e.g., retrieving a predefined motion pattern from a database corresponding to the identified action.

Likewise, upon identifying road signs or traffic lights, depending on an identified type of road sign or an identified state of the traffic lights, corresponding constraints on possible motion patterns of vehicle 10 may then be retrieved from, e.g., a database, a future path of vehicle 10 commensurate with the constraints may be computed, and the actuator control command A may be computed to steer the vehicle such as to execute the trajectory.

Likewise, upon identifying pedestrians and/or vehicles, a projected future behavior of the pedestrians and/or vehicles may be estimated, and based on the estimated future behavior, a trajectory may then be selected such as to avoid collision with the pedestrian and/or the vehicle, and the actuator control command A may be computed to steer the vehicle such as to execute the trajectory.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, actuator command control A may be determined such that propulsion unit and/or steering and/or brake of the mobile robot are controlled such that the mobile robot may avoid collisions with the identified objects.

In a further embodiment, the at least partially autonomous robot may be given by a gardening robot (not shown), which uses sensor 30, preferably an optical sensor, to determine a state of plants in the environment 20. Actuator 10 may be a nozzle for spraying chemicals. Depending on an identified species and/or an identified state of the plants, an actuator control command A may be determined to cause actuator 10 to spray the plants with a suitable quantity of suitable chemicals.

In even further embodiments, the at least partially autonomous robot may be given by a domestic appliance (not shown), like, e.g., a washing machine, a stove, an oven, a microwave, or a dishwasher. Sensor 30, e.g., an optical sensor, may detect a state of an object that is to undergo processing by the household appliance. For example, in the case of the domestic appliance being a washing machine, sensor 30 may detect a state of the laundry inside the washing machine based on image. Actuator control signal A may then be determined depending on a detected material of the laundry.

Figure 3:
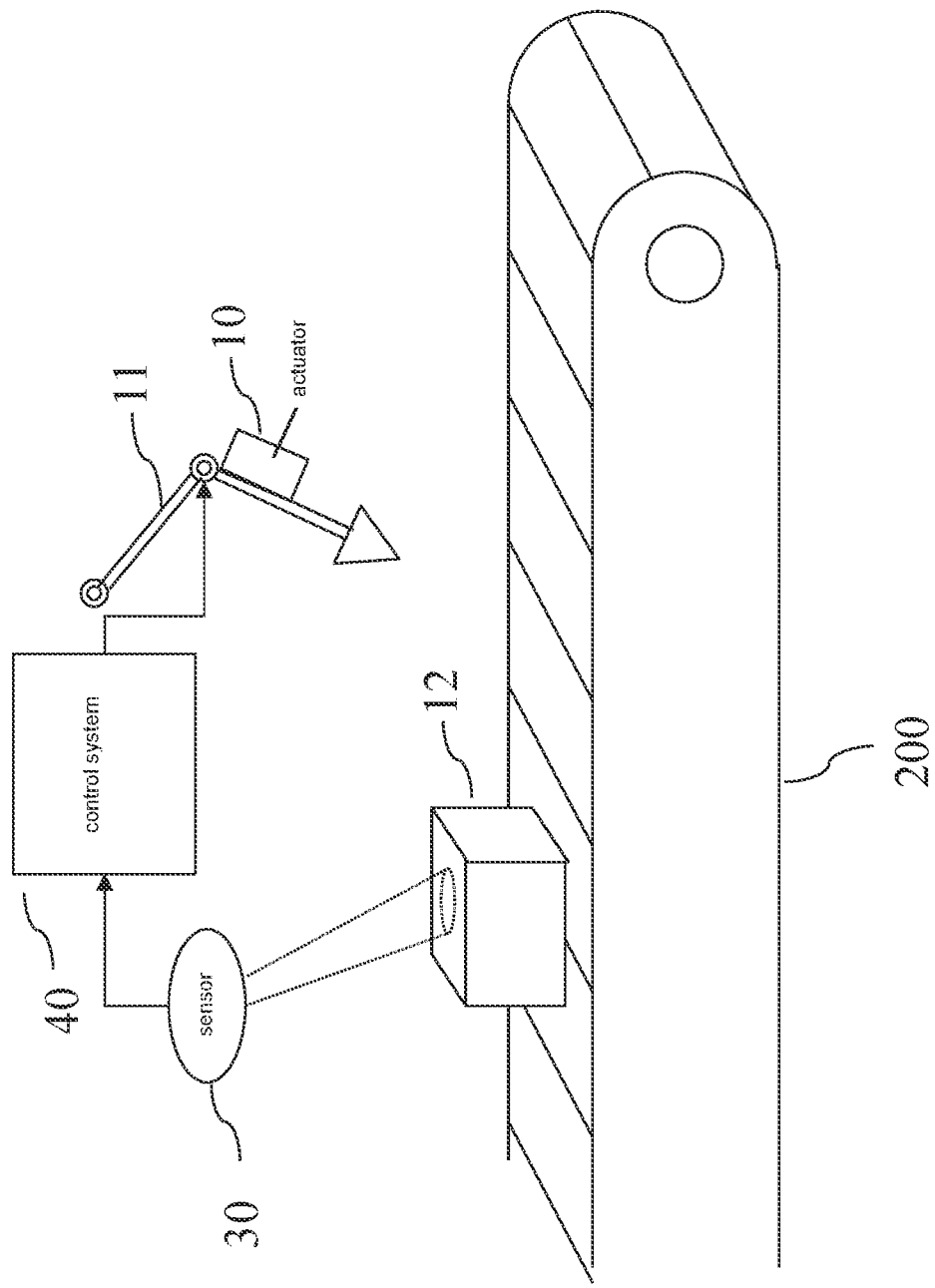
FIG. 3 shows the control system controlling a manufacturing machine, in accordance with an example embodiment of the present invention.

Shown in FIG. 3 is an embodiment in which control system 40 is used to control a manufacturing machine 11, e.g., a punch cutter, a cutter, a gun drill or a gripper) of a manufacturing system 200, e.g., as part of a production line. The control system 40 controls an actuator 10 which in turn control the manufacturing machine 11.

Sensor 30 may be given by an optical sensor that captures properties of, e.g., a manufactured product 12. Classifier 60 may determine a state of the manufactured product 12 from these captured properties, e.g., whether the product 12 is faulty or not. Actuator 10 which controls manufacturing machine 11 may then be controlled depending on the determined state of the manufactured product 12 for a subsequent manufacturing step of manufactured product 12. Alternatively, it may be envisioned that actuator 10 is controlled during manufacturing of a subsequent manufactured product 12 depending on the determined state of the manufactured product 12. For example, actuator 10 may be controlled to select a product 12 that has been identified by classifier 60 as faulty and sort it into a designated bin, where they may be re-checked before discarding them.

Figure 4:
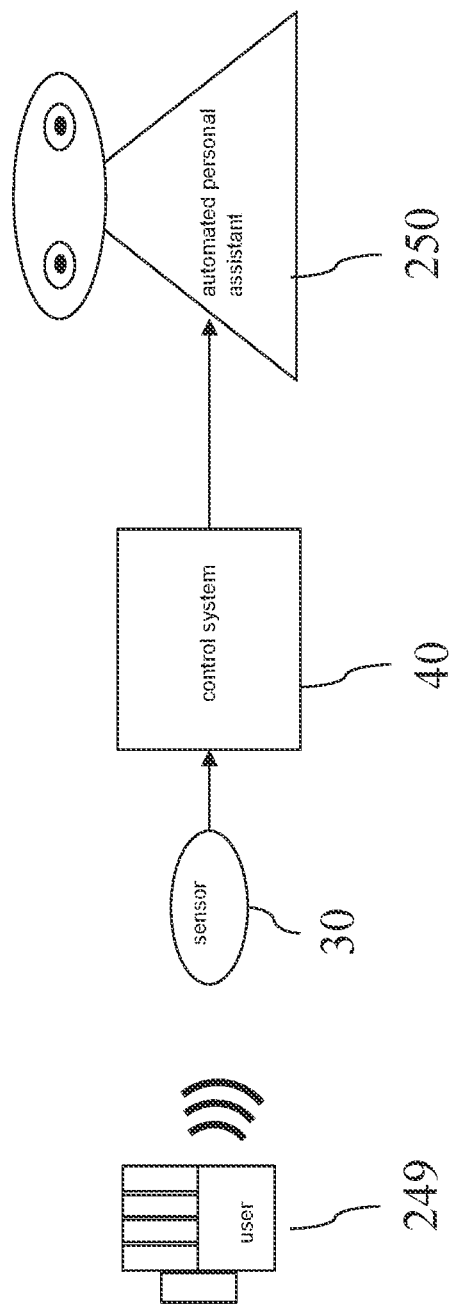
FIG. 4 shows the control system controlling an automated personal assistant, in accordance with an example embodiment of the present invention.

Shown in FIG. 4 is an embodiment in which control system 40 is used for controlling an automated personal assistant 250. Sensor 30 may be an optic sensor, e.g., for receiving video images of a gestures of user 249. Alternatively, sensor 30 may also be an audio sensor, e.g., for receiving a voice command of user 249 as an audio signal.

Control system 40 then determines actuator control commands A for controlling the automated personal assistant 250. The actuator control commands A are determined in accordance with sensor signal S of sensor 30. Sensor signal S is transmitted to the control system 40. For example, classifier 60 may be configured to, e.g., carry out a gesture recognition algorithm to identify a gesture made by user 249. Control system 40 may then determine an actuator control command A for transmission to the automated personal assistant 250. It then transmits the actuator control command A to the automated personal assistant 250.

For example, actuator control command A may be determined in accordance with the identified user gesture recognized by classifier 60. It may then comprise information that causes the automated personal assistant 250 to retrieve information from a database and output this retrieved information in a form suitable for reception by user 249.

In further embodiments, it may be envisioned that instead of the automated personal assistant 250, control system 40 controls a domestic appliance (not shown) controlled in accordance with the identified user gesture. The domestic appliance may be a washing machine, a stove, an oven, a microwave or a dishwasher.

Figure 5:
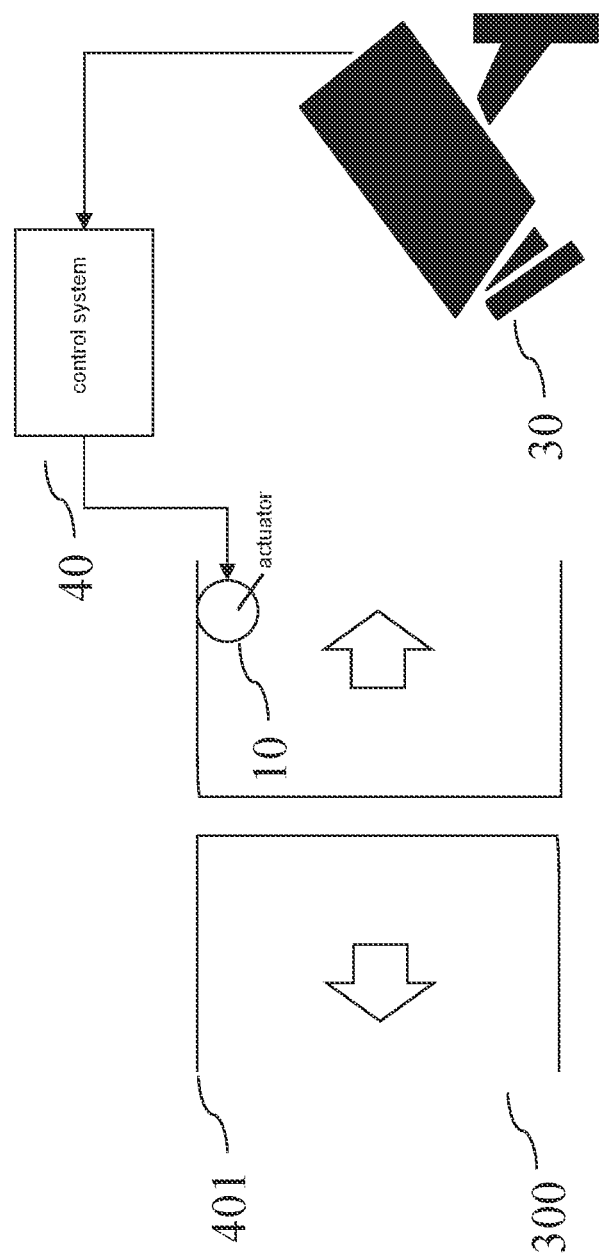
FIG. 5 shows the control system controlling an access control system, in accordance with an example embodiment of the present invention.

Shown in FIG. 5 is an embodiment in which control system controls an access control system 300. Access control system may be designed to physically control access. It may, for example, comprise a door 401. Sensor 30 is configured to detect a scene that is relevant for deciding whether access is to be granted or not. It may for example be an optical sensor for providing image or video data, for detecting a person's face. Classifier 60 may be configured to interpret this image or video data, e.g., by matching identities with known people stored in a database, thereby determining an identity of the person. Actuator control signal A may then be determined depending on the interpretation of classifier 60, e.g., in accordance with the determined identity. Actuator 10 may be a lock that grants access or not depending on actuator control signal A. A non-physical, logical access control is also possible.

Figure 6:
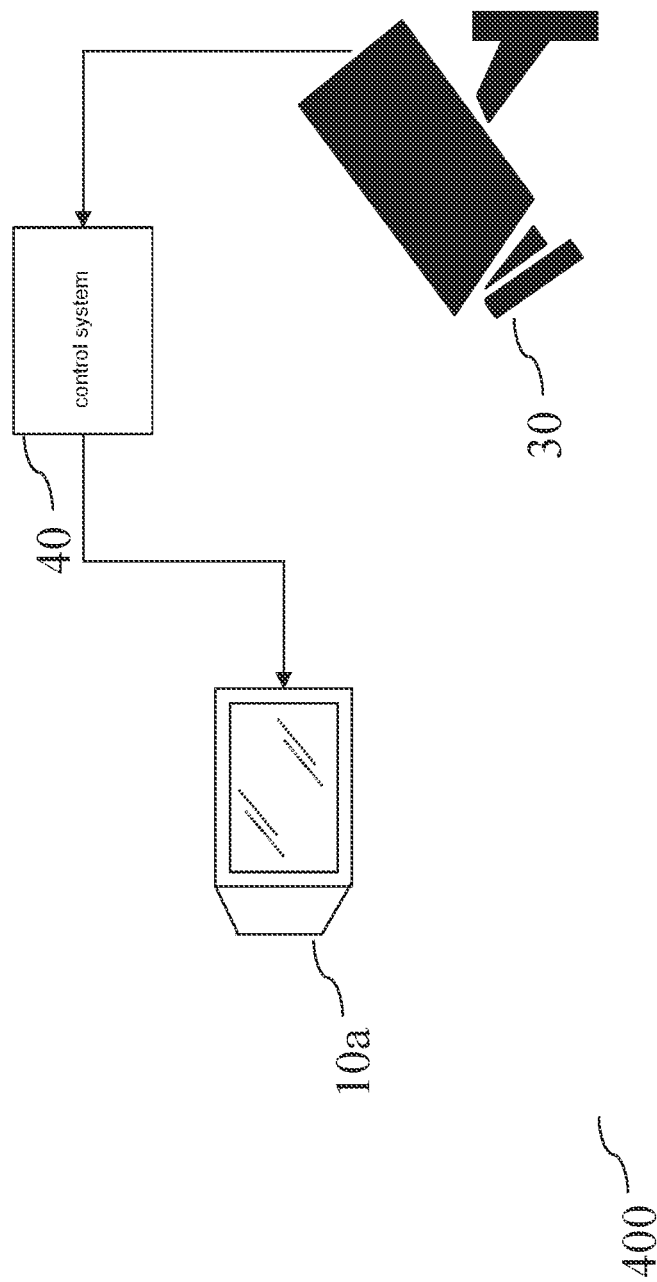
FIG. 6 shows the control system controlling a surveillance system, in accordance with an example embodiment of the present invention.

Shown in FIG. 6 is an embodiment in which control system 40 controls a surveillance system 400. This embodiment is largely identical to the embodiment shown in FIG. 5. Therefore, only the differing aspects will be described in detail. Sensor 30 is configured to detect a scene that is under surveillance. Control system does not necessarily control an actuator 10, but a display 10a. For example, the machine learning system 60 may determine a classification of a scene, e.g., whether the scene detected by optical sensor 30 is suspicious. Actuator control signal A which is transmitted to display 10a may then, e.g., be configured to cause display 10a to adjust the displayed content dependent on the determined classification, e.g., to highlight an object that is deemed suspicious by machine learning system 60.

Figure 7:
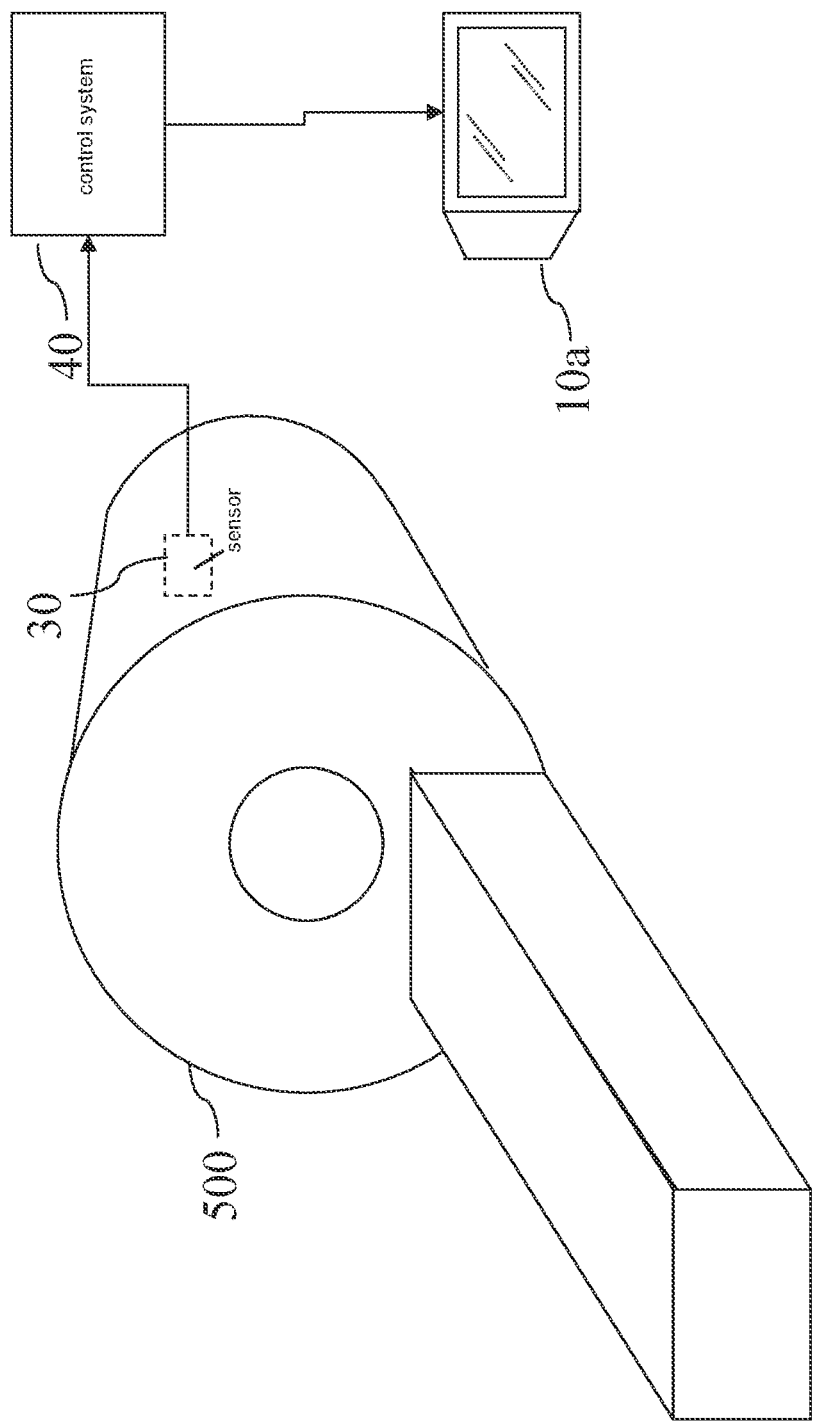
FIG. 7 shows the control system controlling an imaging system, in accordance with an example embodiment of the present invention.

Shown in FIG. 7 is an embodiment of a control system 40 for controlling an imaging system 500, for example an MRI apparatus, x-ray imaging apparatus or ultrasonic imaging apparatus. Sensor 30 may, for example, be an imaging sensor. Machine learning system 60 may then determine a classification of all or part of the sensed image. Actuator control signal A may then be chosen in accordance with this classification, thereby controlling display 10a. For example, machine-learning system 60 may interpret a region of the sensed image to be potentially anomalous. In this case, actuator control signal A may be determined to cause display 10a to display the imaging and highlighting the potentially anomalous region.

Figure 8:
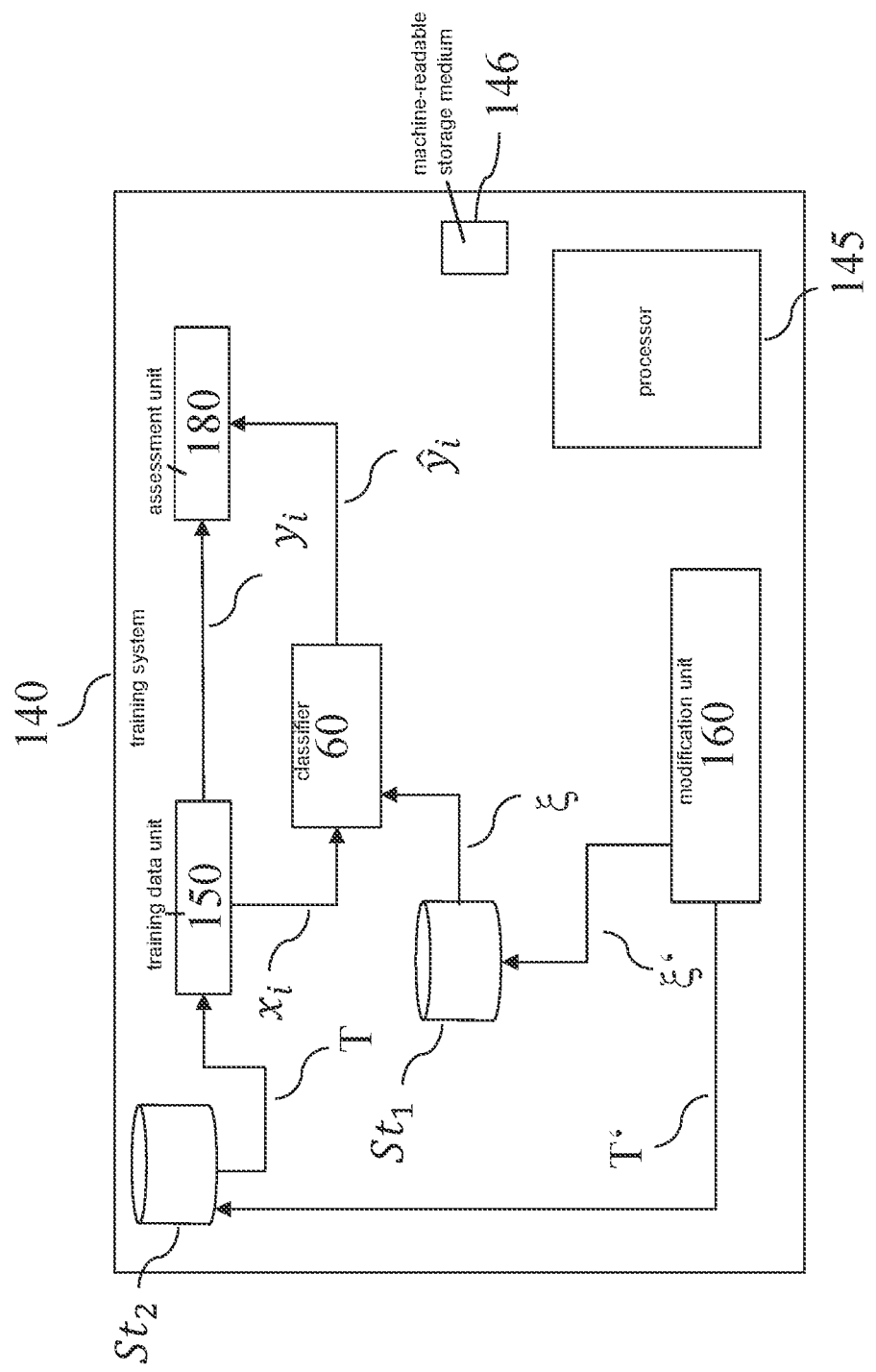
FIG. 8 shows a training system for training the classifier, in accordance with an example embodiment of the present invention.

Shown in FIG. 8 is an embodiment of a training system 140 for training classifier 60. A training data unit 150 determines input signals x, which are passed on to classifier 60. For example, training data unit 150 may access a computer-implemented database $St_2$ in which at least one set T of training data is stored. The at least one set T comprises pairs of input signals $x_i$ and corresponding desired output signals $y_i$. Desired output signal $y_i$ is passed on to assessment unit 180. The set T of training data may be a full set of training data. It may also be a selected batch of training data if training is performed in batches.

Classifier 60 is configured to compute output signals $\hat{y}$ from input signal $x_i$. These output signals $\hat{y}_i$ are also passed on to assessment unit 180.

A modification unit 160 determines updated parameters $\xi'$ depending on input from assessment unit 180. Updated parameters $\xi'$ are transmitted to parameter storage $St_1$ to replace present parameters $\xi$.

Furthermore, training system 140 may comprise a processor 145 (or a plurality of processors) and at least one machine-readable storage medium 146 on which instructions are stored which, if carried out, cause control system 140 to carry out a method according to one aspect of the invention.

Figure 9:
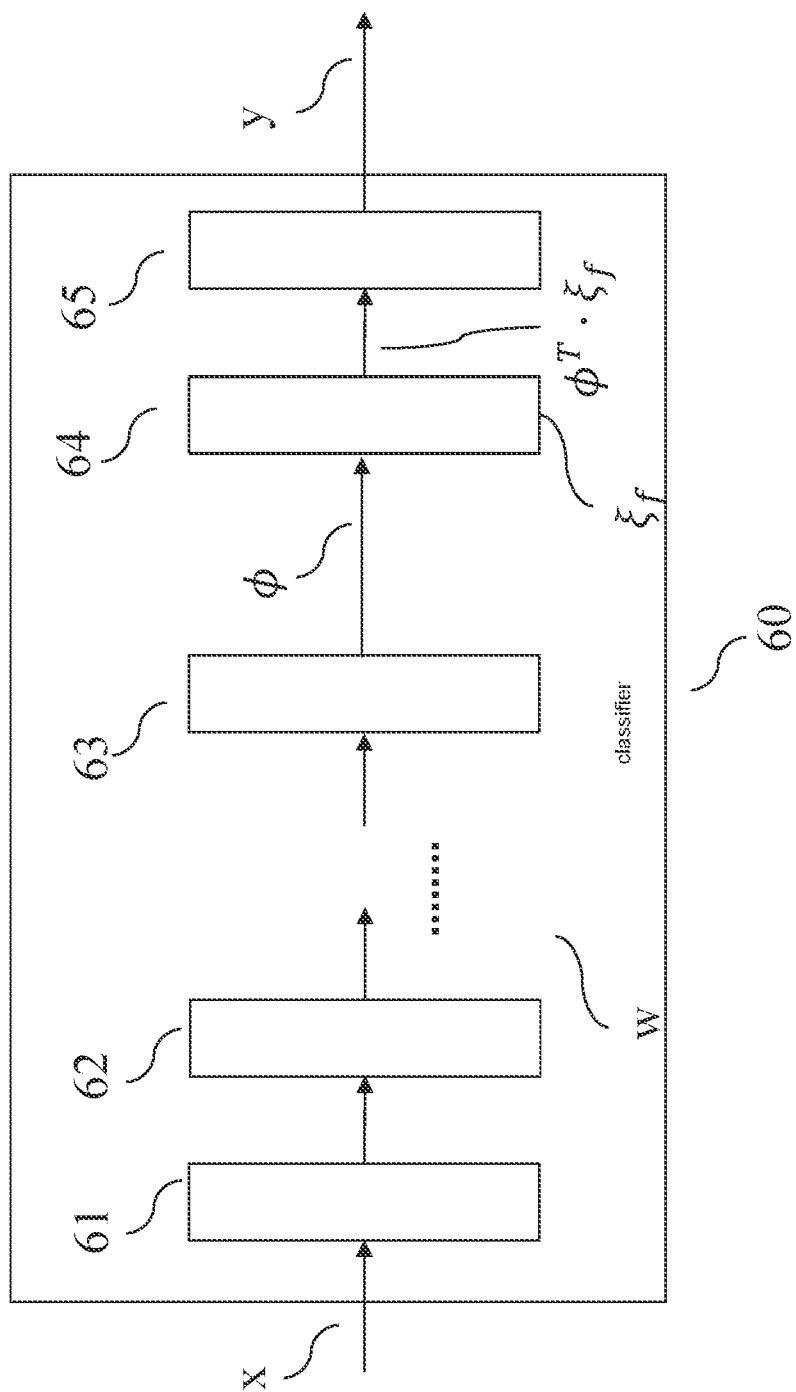
FIG. 9 shows an exemplary structure of the classifier, in accordance with an example embodiment of the present invention.

Shown in FIG. 9 is an exemplary structure of classifier 60, which in this embodiment is given by a neural network that is parametrized by parameters, or weights, $\xi$. Input data is x is fed into input layer 61, processed and then successively passed on to hidden layers 62 and 63. The output of layer 63 is a feature map $\phi$. If classifier 60 is a convolutional neural network, layers 61, 62 and 63 comprise at least one convolutional layer. Parameters that parametrize layers 61, 62 and 63 are called w. Feature map $\phi$ is passed on to a fully-connected layer 64, which is parametrized by parameters $\xi_f$. The output $\phi^T \cdot \xi_f$ is passed on to a final layer 65 that comprises computing a softmax transformation for output $\phi^T \cdot \xi_f$ and an argmax function that selects the label y of the classification that corresponds to the highest softmax score as the output signal of classifier 60.

Figure 10:
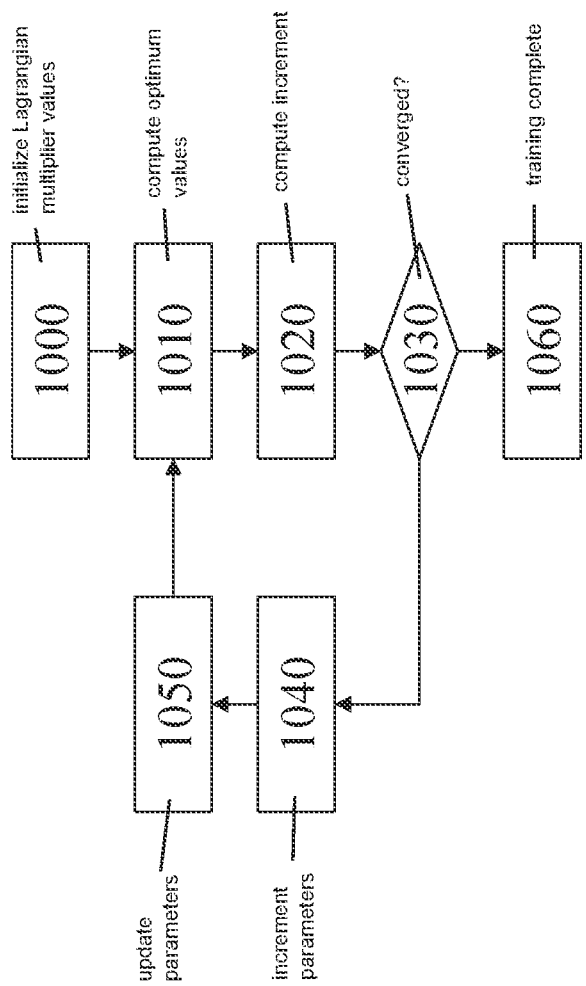
FIG. 10 shows a flow-chart diagram of a training method carried out by the training system, in accordance with an example embodiment of the present invention.

Shown in FIG. 10 is a flow-chart diagram that outlines an embodiment of the training method for training classifier 60 that may be carried out by training system 140. In a first step (1000) Lagrangian multiplier values $\theta$ are initialized, e.g., randomly or as a predefined value, e.g., 0. Parameters $\xi_f$ of fully-connected layer 64 are set equal to Lagrangian multiplier values $\theta$. Dataset T is provided, as well as parameters $a_i, b_i, f_i, g_i$ that characterize the metric as defined in equation (M). Optionally, parameters characterizing a constraint as given in equation (7) are also provided.

Then (1010), optimum values $Q^*$ for the optimization problem stated as the inner minimax problem in equation (5) (or (7), in case constraints are provided) are computed. In addition, a matrix $\Psi$ is computed. Details of this computation are discussed in connection with FIG. 11.

Next (1020), an increment $d\theta = -\Psi(Q^{*T}1 - y_T)$ is computed with $y_T = (y1, \ldots, y_n)^T$ being the vector with the classifications of the training data set.

Then (1030) is checked whether the method is converged, e.g., by checking whether an absolute value of increment dθ is less than a predefined threshold.

If the method has converged, the algorithm is stopped and training is complete (1060).

If not, in optional step (1040), the increment to dθ are taken as an increment to parameters $\xi_f$ of fully-connected layer 64 and backpropagated through the remaining network, i.e., through layers 63, 62 and 61 to obtain an increment dw to parameters w and the method continues with step (1050). Alternatively, parameters w can remain fixed and the method branches directly from step (1030) to step (1050).

In step (1050), parameters θ, $\xi_f$, and w are updated as
θ←θ+dθ
w←w+dw
$\xi_f$←θ.

Then, the method continues with step (1010) and iterates until the method is concluded in step (1060).

Figure 11:
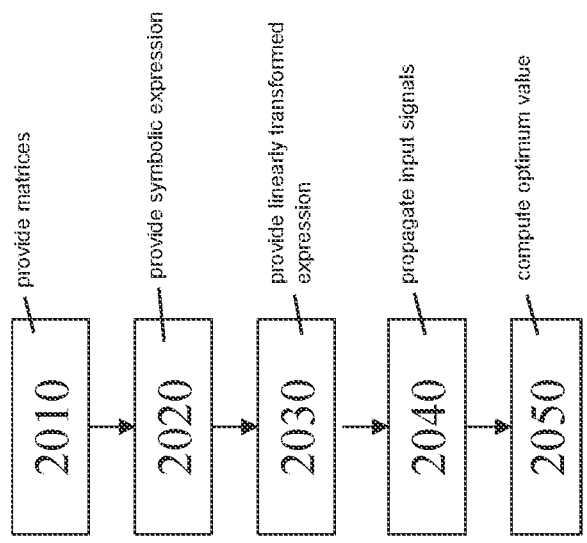
FIG. 11 shows a flow-chart diagram of an aspect of this training method, in accordance with an example embodiment of the present invention.

Shown in FIG. 11 is a flow-chart diagram of the method to compute the optimum value Q* of the inner minimax problem as stated in equation (5) (or (7)) in step (1010).

First (2010), based n×n matrices D, E, F are provided as $$D_{kl} = \sum_j \frac{a_j}{g_j(k, l)}, E_{kl} = \sum_j \frac{b_j}{g_j(k, l)} \text{ and } F_{kl} = \sum_j \frac{f_j}{g_j(k, l)}.$$

Then (2020), Z(Q) is provided as a symbolic expression as $$Z(Q) = QD^T + \text{diag}\left(1, \ldots, \frac{1}{n}\right)^2 Q11^T E^T 11^T - \text{diag}\left(1, \ldots, \frac{1}{n}\right)QE^T 11^T -$$

$$\text{diag}\left(1, \ldots, \frac{1}{n}\right)Q11^T E^T + QE^T + \text{diag}\left(1, \ldots, \frac{1}{n}\right)F^T \text{diag}\left(1, \ldots, \frac{1}{n}\right)Q11^T.$$

Next (2030), a linearly transformed expression Z'(Q) is provided from Z(Q) via Z'(Q)=Z(Q)·diag(1, . . . , n).

Furthermore, c(Q) is computed as c(Q)=0 in case the special cases as defined in equations (S1) and (S2) do not need to be enforced. If we like to enforce (S1), Z(Q) is increased by $$\left(\text{diag}\left(1, \ldots, \frac{1}{n}\right)11^T Q^T - Id\right)\text{diag}\left(1, \ldots, \frac{1}{n}\right)11^T$$

and c(Q) becomes $$c(Q) = 1 - 1^T \text{diag}\left(1, \ldots, \frac{1}{n}\right)Q1,$$

with Id being a n×n-dimensional identity matrix.

If (S2) is to be enforced, Z(Q) is increased by an a n×n-dimensional matrix E that is 0 everywhere, except at position (n, n) where it is set to $Q_{nn}$.

Now (2040), all input signals $x_i$ in dataset T, are propagated through classifier (60) to yield feature vectors $\phi_1(x_i)$. An n×m matrix Ψ (with n being the number of data samples in dataset T and m being the number of features) the columns of which denote the features of each sample as $Ψ_{:,i} = \phi_1(x_i)$ and a matrix W is computed as $W = Ψ^T θ 1^T$.

In case equation (7) is to be solved, the resulting output values of classifier (60) are also stored as $\hat{y}_i$.

Next, (2050) in case equation (5) is to be solved, Q* is computed as the optimum value of the linear program $$\min_{Q;\alpha;\nu} \nu + c(Q) - \langle Q, W \rangle$$

$$\begin{aligned}
\text{s.t.}: & q_{i,k} \geq 0 && \forall\, i, k \in [1, n] \\
& \alpha_{i,k} \geq 0 && \forall\, i, k \in [1, n] \\
& \nu \geq 0 \\
& q_{i,k} \leq \frac{1}{k}\sum_j q_{j,k} && \forall\, i, k \in [1, n] \\
& \sum_k \frac{1}{k}\sum_i q_{i,k} \leq 1 \\
& \nu \geq (Z'(Q))_{(i,k)} - \alpha_{i,k} + \frac{1}{k}\sum_j \alpha_{j,k}, && \forall\, i, k \in [1, n],
\end{aligned}$$

In case equation (7) is to be solved, a matrices $B^{(i)}$ and scalars $\mu_i$ are defined for each constraint of equation (7) by computing $$\mathbb{E}_{(\hat{P}(X,Y);P(\hat{Y}))}(\text{metric}^i(\hat{Y},Y)) =: \langle B^{(i)}, P \rangle + \mu_i$$

This is done by defining for each constraint i the vectors $D_k^i =$ $$\sum_j \frac{a_j}{g_j(k, l)}, E_k^i = \sum_j \frac{b_j}{g_j(k, l)} \text{ and } F_k^i = \sum_j \frac{f_j}{g_j(k, l)}$$

for l=$\Sigma_i y_i$ and setting:

$$B^{(i)} = D^i y^T + E^i (1 - y)^T + \text{diag}\left(1, \ldots, \frac{1}{n}\right)[F^i + (n - l)E^i]1^T$$

$$\mu_i = 0$$

If neither (S1) nor (S2) are enforced for any i.

If (S1) is enforced, the above mentioned expression remains the same as long as l=$\Sigma_i y_i$>0. If we have l=0, and the above variables are set as $$B^{(i)} = -\text{diag}\left(1, \ldots, \frac{1}{n}\right)11^T$$

$$\mu_i = 1$$

If (S2) is enforced, the above-mentioned expression (prior to the S1 special case) remains the same as long as l=$\Sigma_i y_i$<n. If we have l=n, we choose $\mu_i$=0 and $B^{(i)}$ as a n×n-dimensional matrix that is 0 everywhere except at position (n, n) where it is 1.

Then, Q* is obtained as the optimum value by solving the linear program $$\min_{Q;\alpha;\beta;\nu} \nu + c(Q) - \langle Q, W \rangle + \sum_l (\mu_l - \tau_l)$$

-continued $$\text{s.t.} : q_{i,k} \geq 0 \qquad \forall\, i, k \in [1, n]$$
$$\alpha_{i,k} \geq 0 \qquad \forall\, i, k \in [1, n]$$
$$\beta_l \geq 0 \qquad \forall\, l, \in [1, s]$$
$$v \geq 0$$
$$q_{i,k} \leq \frac{1}{k}\sum_j q_{j,k} \qquad \forall\, i, k \in [1, n]$$
$$\sum_k \frac{1}{k}\sum_i q_{i,k} \leq 1$$
$$v \geq (Z'(Q))_{(i,k)} - \alpha_{i,k} + \frac{1}{k}\sum_j \alpha_{j,k} + \sum_l \beta_l (B'^{(l)})_{(i,k)}, \quad \forall\, i, k \in [1, n].$$

This concludes the method.

The term "computer" covers any device for the processing of predefined calculation instructions. These calculation instructions can be in the form of software, or in the form of hardware, or also in a mixed form of software and hardware.

It is further understood that the procedures cannot only be completely implemented in software as described. They can also be implemented in hardware, or in a mixed form of software and hardware.

What is claimed is:

1. A computer-implemented method for training a classifier for classifying input signals to optimize performance according to a non-decomposable metric that measures an alignment between classifications corresponding to input signals of a set of training data and corresponding predicted classifications of the input signals obtained from the classifier, the method comprising the following steps:
providing weighting factors that characterize how the non-decomposable metric depends on a plurality of terms from a confusion matrix of the classifications and the predicted classifications; and
training the classifier depending on the provided weighting factors;
wherein the non-decomposable metric is given by the formula $$\Sigma_j \frac{a_j \cdot TP + b_j \cdot TN + f_j(PP, AP, PN, AN)}{g_j(PP, AP, PN, AN)},$$

where $a_j$ and $b_j$ are scalar values and $f_j$ and $g_j$ are functions, and TP, TN, PP, PN, AP and AN are entries of the confusion matrix, wherein TP="true positive", TN="true negative", PP="predicted positive", PN="predicted negative", AP="actual positive" and AN="actual negative";
wherein the optimization is carried out by finding an equilibrium of a two-player game between a first player and a second player, wherein the first player tries to find first classifications corresponding to input signals of the training data and the second player tries to find second classifications corresponding to input values of the training data, and wherein the first player tries to maximize and the second player tries to minimize an expectation value of a metric in which the confusion matrix is evaluated based on the first classifications and the second classifications, wherein the second classifications are subject to a moment-matching constraint; and
wherein the expectation value is computed based on marginal probabilities of the first classifications and/or the second classifications.

2. The method according to claim 1, wherein classifier is a binary classifier, and the optimization is carried out by finding an optimum value of a Lagrangian multiplier corresponding to the moment-matching constraint and wherein trained parameters of a fully-connected layer of the binary classifier are set equal to the optimum value of the Lagrangian multiplier.

3. The method according to claim 1, wherein the optimization includes solving the two-player game by solving a linear program in only one of those two players.

4. The method according to claim 1, wherein the optimization of the performance according to the non-decomposable metric is further subject to an inequality constraint of an expected value of a second metric that measures an alignment between the classifications and the predicted classifications.

5. A computer-implemented method for using a classifier for classifying sensor signals, wherein the classifier is trained to optimize performance according to a non-decomposable metric that measures an alignment between classifications corresponding to input signals of a set of training data and corresponding predicted classifications of the input signals obtained from the classifier, the training including providing weighting factors that characterize how the non-decomposable metric depends on a plurality of terms from a confusion matrix of the classifications and the predicted classifications, and training the classifier depending on the provided weighting factors, the method comprising the following steps:
receiving a sensor signal including data from a sensor;
determining a first input signal which depends on the sensor signal; and
feeding the first input signal into the classifier to obtain an output signal that characterizes a classification of the first input signal;
wherein the non-decomposable metric is given by the formula $$\Sigma_j \frac{a_j \cdot TP + b_j \cdot TN + f_j(PP, AP, PN, AN)}{g_j(PP, AP, PN, AN)},$$

where $a_j$ and $b_j$ are scalar values and $f_j$ and $g_j$ are functions, and TP, TN, PP, PN, AP and AN are entries of the confusion matrix, wherein TP="true positive", TN="true negative", PP="predicted positive", PN="predicted negative", AP="actual positive" and AN="actual negative";
wherein the optimization is carried out by finding an equilibrium of a two-player game between a first player and a second player, wherein the first player tries to find first classifications corresponding to input signals of the training data and the second player tries to find second classifications corresponding to input values of the training data, and wherein the first player tries to maximize and the second player tries to minimize an expectation value of a metric in which the confusion matrix is evaluated based on the first classifications and the second classifications, wherein the second classifications are subject to a moment-matching constraint; and
wherein the expectation value is computed based on marginal probabilities of the first classifications and/or the second classifications.

6. A computer-implemented method for using a classifier trained for providing an actuator control signal for controlling an actuator, wherein the classifier is trained to optimize performance according to a non-decomposable metric that measures an alignment between classifications corresponding to input signals of a set of training data and corresponding predicted classifications of the input signals obtained from the classifier, the training including providing weighting factors that characterize how the non-decomposable metric depends on a plurality of terms from a confusion matrix of the classifications and the predicted classifications, and training the classifier depending on the provided weighting factors, the method comprising the following steps:

receiving a sensor signal including data from a sensor;

determining a first input signal which depends on the sensor signal;

feeding the first input signal into the classifier to obtain an output signal that characterizes a classification of the first input signal; and determining the actuator control signal depending on the output signal;

wherein the non-decomposable metric is given by the formula $$\Sigma_j \frac{a_j \cdot TP + b_j \cdot TN + f_j(PP, AP, PN, AN)}{g_j(PP, AP, PN, AN)},$$

where $a_j$ and $b_j$ are scalar values and $f_j$ and $g_j$ are functions, and TP, TN, PP, PN, AP and AN are entries of the confusion matrix, wherein TP="true positive", TN="true negative", PP="predicted positive", PN="predicted negative", AP="actual positive" and AN="actual negative";

wherein the optimization is carried out by finding an equilibrium of a two-player game between a first player and a second player, wherein the first player tries to find first classifications corresponding to input signals of the training data and the second player tries to find second classifications corresponding to input values of the training data, and wherein the first player tries to maximize and the second player tries to minimize an expectation value of a metric in which the confusion matrix is evaluated based on the first classifications and the second classifications, wherein the second classifications are subject to a moment-matching constraint; and wherein the expectation value is computed based on marginal probabilities of the first classifications and/or the second classifications.

7. The method according to claim 6, wherein the actuator controls an at least partially autonomous robot, and/or a manufacturing machine, and/or an access control system.

8. A non-transitory machine readable storage medium on which is stored a computer program for training a binary classifier for classifying input signals to optimize performance according to a non-decomposable metric that measures an alignment between classifications corresponding to input signals of a set of training data and corresponding predicted classifications of the input signals obtained from the classifier, the computer program when executed by a computer, causing the computer to perform the following steps:

providing weighting factors that characterize how the non-decomposable metric depends on a plurality of terms from a confusion matrix of the classifications and the predicted classifications; and training the classifier depending on the provided weighting factors;

wherein the non-decomposable metric is given by the formula $$\Sigma_j \frac{a_j \cdot TP + b_j \cdot TN + f_j(PP, AP, PN, AN)}{g_j(PP, AP, PN, AN)},$$

where $a_j$ and $b_j$ are scalar values and $f_j$ and $g_j$ are functions, and TP, TN, PP, PN, AP and AN are entries of the confusion matrix, wherein TP="true positive", TN="true negative", PP="predicted positive", PN="predicted negative", AP="actual positive" and AN="actual negative"; and wherein the optimization is carried out by finding an equilibrium of a two-player game between a first player and a second player, wherein the first player tries to find first classifications corresponding to input signals of the training data and the second player tries to find second classifications corresponding to input values of the training data, and wherein the first player tries to maximize and the second player tries to minimize an expectation value of a metric in which the confusion matrix is evaluated based on the first classifications and the second classifications, wherein the second classifications are subject to a moment-matching constraint; and wherein the expectation value is computed based on marginal probabilities of the first classifications and/or the second classifications.

9. A control system for operating an actuator, the control system comprising:

a classifier trained for classifying input signals to optimize performance according to a non-decomposable metric that measures an alignment between classifications corresponding to input signals of a set of training data and corresponding predicted classifications of the input signals obtained from the classifier, the classifier being trained by providing weighting factors that characterize how the non-decomposable metric depends on a plurality of terms from a confusion matrix of the classifications and the predicted classifications, and training the classifier depending on the provided weighting factors;

wherein the control system is configured to operate the actuator in accordance with an output of the classifier;

wherein the non-decomposable metric is given by the formula $$\Sigma_j \frac{a_j \cdot TP + b_j \cdot TN + f_j(PP, AP, PN, AN)}{g_j(PP, AP, PN, AN)},$$

where $a_j$ and $b_j$ are scalar values and $f_j$ and $g_j$ are functions, and TP, TN, PP, PN, AP and AN are entries of the confusion matrix, wherein TP="true positive", TN="true negative", PP="predicted positive", PN="predicted negative", AP="actual positive" and AN="actual negative"; and wherein the optimization is carried out by finding an equilibrium of a two-player game between a first player and a second player, wherein the first player tries to find first classifications corresponding to input signals of the training data and the second player tries to find second classifications corresponding to input values of the training data, and wherein the first player tries to maximize and the second player tries to minimize an expectation value of a metric in which the confusion matrix is evaluated based on the first classifications and the second classifications, wherein the second classifications are subject to a moment-matching constraint; and wherein the expectation value is computed based on marginal probabilities of the first classifications and/or the second classifications.

10. A control system that is configured to use a classifier for classifying sensor signals, wherein the classifier is trained to optimize performance according to a non-decomposable metric that measures an alignment between classifications corresponding to input signals of a set of training data and corresponding predicted classifications of the input signals obtained from the classifier, the training including providing weighting factors that characterize how the non-decomposable metric depends on a plurality of terms from a confusion matrix of the classifications and the predicted classifications, and training the classifier depending on the provided weighting factors, the control system configured to:

receive a sensor signal including data from a sensor;
determine a first input signal which depends on the sensor signal; and
feed the first input signal into the classifier to obtain an output signal that characterizes a classification of the first input signal;
wherein the non-decomposable metric is given by the formula $$\Sigma_j \frac{a_j \cdot TP + b_j \cdot TN + f_j(PP, AP, PN, AN)}{g_j(PP, AP, PN, AN)},$$

where $a_j$ and $b_j$ are scalar values and $f_j$ and $g_j$ are functions, and TP, TN, PP, PN, AP and AN are entries of the confusion matrix, wherein TP="true positive", TN="true negative", PP="predicted positive", PN="predicted negative", AP="actual positive" and AN="actual negative"; and wherein the optimization is carried out by finding an equilibrium of a two-player game between a first player and a second player, wherein the first player tries to find first classifications corresponding to input signals of the training data and the second player tries to find second classifications corresponding to input values of the training data, and wherein the first player tries to maximize and the second player tries to minimize an expectation value of a metric in which the confusion matrix is evaluated based on the first classifications and the second classifications, wherein the second classifications are subject to a moment-matching constraint; and wherein the expectation value is computed based on marginal probabilities of the first classifications and/or the second classifications.

11. A training system configured train a classifier for classifying input signals to optimize performance according to a non-decomposable metric that measures an alignment between classifications corresponding to input signals of a set of training data and corresponding predicted classifications of the input signals obtained from the classifier, the training system configured to:

provide weighting factors that characterize how the non-decomposable metric depends on a plurality of terms from a confusion matrix of the classifications and the predicted classifications; and
train the classifier depending on the provided weighting factors;
wherein the non-decomposable metric is given by the formula $$\Sigma_j \frac{a_j \cdot TP + b_j \cdot TN + f_j(PP, AP, PN, AN)}{g_j(PP, AP, PN, AN)},$$

where $a_j$ and $b_j$ are scalar values and $f_j$ and $g_j$ are functions, and TP, TN, PP, PN, AP and AN are entries of the confusion matrix, wherein TP="true positive", TN="true negative", PP="predicted positive", PN="predicted negative", AP="actual positive" and AN="actual negative"; and wherein the optimization is carried out by finding an equilibrium of a two-player game between a first player and a second player, wherein the first player tries to find first classifications corresponding to input signals of the training data and the second player tries to find second classifications corresponding to input values of the training data, and wherein the first player tries to maximize and the second player tries to minimize an expectation value of a metric in which the confusion matrix is evaluated based on the first classifications and the second classifications, wherein the second classifications are subject to a moment-matching constraint; and wherein the expectation value is computed based on marginal probabilities of the first classifications and/or the second classifications.

12. The method as recited in claim 1, wherein the classifier is a binary classifier.

13. The method as recited in claim 1, wherein the marginal probabilities represent marginal probabilities of a classification of a given input value being equal to a predefined classification and a sum of all classifications being equal to a predefined sum value.

* * * * *